United States Patent
Long et al.

(10) Patent No.: US 7,138,012 B2
(45) Date of Patent: Nov. 21, 2006

(54) RECYCLED WASTE AS AIR ENTRAINMENT ADMIXTURES

(75) Inventors: David Long, Fullerton, CA (US); M. D. Poole, Redlands, CA (US)

(73) Assignee: Waste Markets Corporation, Stateline, NV (US)

( * ) Notice: Subject to any disclaimer, the term of this patent is extended or adjusted under 35 U.S.C. 154(b) by 0 days.

(21) Appl. No.: 10/509,283

(22) PCT Filed: Sep. 9, 2002

(86) PCT No.: PCT/US02/28726

§ 371 (c)(1),
(2), (4) Date: Sep. 22, 2004

(87) PCT Pub. No.: WO03/095389

PCT Pub. Date: Nov. 20, 2003

(65) Prior Publication Data

US 2005/0115467 A1     Jun. 2, 2005

Related U.S. Application Data

(60) Provisional application No. 60/379,554, filed on May 7, 2002.

(51) Int. Cl.
  *C04B 18/00*   (2006.01)
  *C04B 24/00*   (2006.01)

(52) U.S. Cl. .............. 106/724; 106/661; 106/696; 106/697; 106/822; 106/823

(58) Field of Classification Search ............. 106/724, 106/823, 661, 696, 697, 822
See application file for complete search history.

(56) References Cited

U.S. PATENT DOCUMENTS

| | | | | |
|---|---|---|---|---|
| 3,563,777 A | * | 2/1971 | Pratt et al. ................... | 524/5 |
| 4,081,285 A | * | 3/1978 | Pennell ....................... | 106/740 |
| 4,968,734 A | * | 11/1990 | Gaidis et al. ................ | 524/5 |
| 5,413,633 A | * | 5/1995 | Cook et al. ................. | 106/672 |
| 5,654,352 A | * | 8/1997 | MacDonald ................. | 524/18 |

FOREIGN PATENT DOCUMENTS

| | | | |
|---|---|---|---|
| JP | 49023450 | * | 3/1974 |
| JP | 60133399 | * | 7/1985 |

OTHER PUBLICATIONS

"Effect of complex industrial waste-based plasticizers on concrete" Levina et al. Beton i Zhelezobeton (Moscow Russian Federation) (1989), (11), 10-11. Abstract only.*

"Effect of surface active substances on the properties of cements containing additions", Butt et al. Tsement (1952), 18 (No. 6), 15-18. Abstract only.*

(Continued)

*Primary Examiner*—Paul Marcantoni
(74) *Attorney, Agent, or Firm*—Rutan & Tucker, LLP

(57) ABSTRACT

Use of waste generated as a byproduct of a first manufacturing process as an air entraining admixture (AEA) in a second product. In some instances, the waste materials can be used as an AEA during cement and/or concrete formation, and may also be waste materials produced during shampoo manufacturing. It is contemplated that the use of non-conventional materials as an AEA conventional applications will often result in products that have performance characteristics similar to conventional AEAs.

22 Claims, 1 Drawing Sheet

100

110 obtaining a waste material resulting from the manufacture of a first product

120 utilizing the obtained waste material as an air entraining admixture in the production of a second product

OTHER PUBLICATIONS

"Effect of the nature of sufactants on air intake in cement and lime-sand mixes", Ashimov et al. Azerbaidzhanskii Khimicheskii Zhurnal (1973), (1), 74-7.*

"Concrete Materials—Properties, Specifications, and Testing", Sandor Popovics, Noyes Publication, 1992.

"1992 Annual Book of ASTM Standards", ASTM, vol. 04.01, 1992.

"Design and Control of Concrete Mixtures", Kosmatka and Panarese, 13$^{th}$ Edition, pp. 16-17.

"Concrete Admixtures Handbook", Ramachandran, Noyes Publications, 1995, pp. 154-156.

* cited by examiner

100

110 obtaining a waste material resulting from the manufacture of a first product

120 utilizing the obtained waste material as an air entraining admixture in the production of a second product

Fig. 1

# RECYCLED WASTE AS AIR ENTRAINMENT ADMIXTURES

This application claims the benefit of U.S. provisional application No. 60/379,554, titled "Recycling of Shampoo Wastes" and filed May 7, 2002, incorporated herein by reference in its entirety.

FIELD OF THE INVENTION

The field of the invention is waste recycling and concrete formation.

BACKGROUND OF THE INVENTION

The production of shampoo, body soaps, hair conditioners and similar personal care products are an important segment of the health and beauty market. These products typically consist of water, surfactants, fragrances, and proprietary ingredients, and are ubiquitous throughout society. The manufacture of such products generally requires close quality control procedures, and a high standard of sanitary conditions, similar to that found in the food or pharmaceutical industry.

Many shampoo production facilities manufacture a number of similar products, usually in standard, batching operation. When production is switched between differing varieties it is not uncommon that all equipment must be drained, washed and rinsed. Waste from shampoo manufacturing typically is found in either a concentrated or dilute form. Concentrated shampoo waste (being similar to shampoo products) is generally derived from draining of lines, materials not meeting specifications, dated product, discontinued product, and formulation constituents. Diluted shampoo waste is generally the "rinse water" generated during formulation change over purging of lines, clean-up operations, and rinsing of equipment and tanks. The difference in the concentrated and dilute forms is in the percentage of residual shampoo product. Rinse waters typically have less than 10%, while concentrated forms of waste will have greater than 10%, and may essentially be 100% shampoo materials.

Disposal of the dilute rinse water is usually via the sanitary sewer, and hence to a Public Owned Treatment Works (POTW). The dilute waste will have a slightly elevated pH, elevated Biochemical Oxygen Demand (BOD), foam and odor. Large volumes discharged to the sewer system can negatively impact the POTW, through altering influent pH, creating excessive foaming especially in secondary aeration tanks, and consuming treatment capacity due to increased influent BOD values. These impacts are frequently offset by additional sewering charges paid by the discharger.

Disposal of the concentrate waste is more problematic, due to a very high pH and constituent concentrations that may exceed sewer discharge standards at best and hazardous waste definitions frequently. The concentrate may also be hazardous due to bioassay assessment. Shampoo waste concentrate is typically collected by the manufacturer and shipped off-site for disposal/destruction at appropriately permitted facilities.

The costs to the manufacturer for the disposal of both dilute rinse waste and concentrate waste is significant. Equipment and manufacturing designs help assure that, minimal waste production occurs during batch changing operations, and quality control procedures help minimize the frequency of out of specification materials. Still, significant volumes of waste material are generated annually.

Portland cement manufacturing is a world wide industry with cement kilns located throughout the world. Over 100 million tons of cement is produced annually. Cement manufacture uses a variety of minerals, which when blended, ground and calcined form a intermediate product known as cement clinker. Calcium aluminum, iron, and silica are the primary elemental components of cement clinker. Clinker is finely ground with a small percentage of gypsum-added to produce ordinary portland cement (OPC). Cement specifications designate the chemistry and attributes of the cement. Cement, when mixed with water, sand and possibly an aggregate, cures to form a hardened material called concrete. Concrete with no aggregate is often referred to as grout or mortar. The American Society for Testing and Materials (ASTM) identifies a number of cement types, each with a differing set of performance specifications.

Materials added to the OPC during grinding operations or added when concrete is being prepared can impart specific characteristics of value to the builder. One of the functional additions is air entraining admixtures (AEA). AEA can be added during the grinding of cement clinker, or added to OPC as part of the concrete recipe. AEA materials form small air bubbles in the concrete matrix while in the wet stage, which are maintained through hardening and curing. Air entrained concrete is superior to concrete formed from OPC for applications where frost resistance is important, when used as a mortar, in stucco, or where workability is important. Air entrained portland cement is a value added material, being sold at prices well above OPC.

Air entrained portland cement and air entrainment admixtures have been widely used throughout the cement industry since the early 1950's. There are a number of types available commercially, with specific formulations either patented or proprietary in nature. Materials used as AEAs include 1. The salts of wood resins; 2. Synthetic detergents; 3. Salts of sulfonated lignin; salts of petroleum acids; fatty or resinous acids and their salts. The manufacture of air entrained portland cement and air entrained concrete is a well known and accepted art.

Air entrainment is measured as a percentage of air in a specifically prepared mortar sample. Test protocols are well established such as in ASTM C185, "Test Method for Air Content in Hydraulic Cement Mortar". For reference purposes OPC will often have about 6% air entrained, while an AEA portland cement will often have up to 25% air entrainment. The manufacture, based on intended use and performance criteria determines the percentage of entrained air.

Further information relating to concrete can be found in the work titled "Concrete Materials—Properties, Specifications, and Testing" by Sandor Popovics and published by Noyes Publication in 1992 (herein incorporated by reference in its entirety).

SUMMARY OF THE INVENTION

The present invention is directed to the use of waste generated as a byproduct of a first manufacturing process as an air entraining admixture (AEA) in a second product. In some instances, the waste materials can be used as an AEA during cement and/or concrete formation, and may also be waste materials produced during shampoo manufacturing. It is contemplated that the use of non-conventional materials as an AEA in conventional applications will often result in products that have performance characteristics similar to conventional AEAs.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 1 is a diagram of a first method embodying the invention.

DETAILED DESCRIPTION

Referring to FIG. 1, a method 100 of recycling waste comprises: step 110, obtaining a waste material resulting from the manufacture of a first product; and step 120, utilizing the obtained waste material as an air entraining admixture in the production of a second product.

First Product

The first product could be any product for which waste material is generated during the product's production. However, it is contemplated that the waste material may be more likely to be suitable as an AEA for products that are soaps or shampoos for personal use. The phrase "for personal use" as used herein indicates that the use relates to washing a person's skin or hair. Shampoos, as the term is used herein, include any of various liquid or cream preparations of soap or detergent used to wash the hair and scalp (i.e. for personal use), and any of various cleaning agents for rugs, upholstery, or cars. Other products that are contemplated to involve waste materials suitable as AEAs include waste residuals from the manufacture of soaps, detergents, and similar products, even if the products are not designed, for personal use. As such, production of products like dish washer soaps, laundry detergents, and rug cleaners may generate waste materials suitable as AEAs. It is also contemplated that any product containing a foaming agent may be suitable as waste material generated during production of such products will likely also contain a foaming agent and be particularly well suited for use as an AEA.

Waste Material

The waste material may be any material that is a byproduct of the production of the first product and is also suitable for use as an AEA in producing a second product. It is contemplated that the waste materials suitable for use as AEAs will include quantities of the first product that failed to meet required specifications, have aged beyond their useful life, or that are no longer being offered for sale. It is also contemplated that the waste materials suitable for AEAs may also include quantities of the first product or components of the first product that are mixed with rinse water used in purging of lines, clean-up operations, and rinsing of equipment and tanks where such lines, equipment, and tanks are used in the production of the first product.

Other waste materials contemplated a being suitable for AEAs include waste residuals from the manufacture of soaps and detergents or other products containing a foaming agent.

It is contemplated that the methods disclosed herein will be particularly advantageous when the waste material has characteristics that are problematic when disposing of the material, or characteristics that make it particularly suitable for use as an AEA. Some contemplated characteristics include: the waste material being a liquid; the waste material having a pH greater than 8.0; the waste material having a BOD concentration greater than 1000 mg/L; the waste material being likely to cause foaming in aeration tanks of treatment plants; and the waste material containing no toxic or regulated compounds.

As previously discussed, waste material comprising soap or shampoo is contemplated as being particularly suitable for use as an AEA in the methods and materials disclosed herein. It is contemplated that some such soaps detergents or shampoos can be characterized as comprising water, at least one-surfactant, and at least one fragrance. Other such soaps and/or shampoos may be characterized has comprising water at least one surfactant and sodium silicate.

Obtaining the Waste Material

Obtaining the waste material may be accomplished in any manner that makes the waste material available for use as an AEA in the production of a second product. However, it is contemplated that obtaining the waste material may advantageously comprise one or more of the steps described in the follow paragraphs.

One method of obtaining waste material is simply to acquire quantities of the first product that fail to meet required specifications, have aged beyond their useful life, or that are no longer being offered for sale. Instead of simply disposing of such product, it is gathered, transported and used as an AEA. Prior to its use it may be subjected to additional processing steps to place it in a form more suitable for use as an AEA in the production of the second product.

Another method of accumulating waste shampoo, soaps, or detergents is removal of residuals from storage containers, mixing vessels, conduits, or pipes. Such materials are available during formulation change overs when multiple products are produced using the same formulation equipment lines. A more dilute product can be obtained from accumulation of rinse waters used to clean the formulation equipment.

It is contemplated that obtaining waste materials comprising detergents, soaps, dish washers cleaning solutions or dish detergents will often involve similar accumulation schemes.

Second Product

The second product may be any product during the production of which the waste material can be used as an AEA. It's important to note that the use of the waste material as an AEA need not actually have a positive impact on the second product as disposal of the waste material by including it in the second product maybe the only desired benefit. However, it is contemplated that many products will actually benefit from including of waste material as an AEA. Such products include, portland cement, concrete and products derived concrete, precast concrete objects concrete designed for cold climate exposures, stucco, mortars and grouts.

Utilizing the Waste Materials during Production of the Second Product

The actual method of using the waster material as an AEA in the production of the second product will vary between embodiments, primarily in relation to differences in the, second product being produced. As such, if the second product is cement, the AEA may be incorporated during, formation of the clinker, possibly during grinding of the clinker. When concentrated shampoo waste is used in the production of cement by including it during the grinding of cement clinker, addition rates will typically be 0.05% to 0.75% on a weight-to-weight basis with the clinker. The resultant cement will have an air entraining feature, be a dry powder similar in look to OPC or any other air entraining portland cement. It should be noted that addition rates are based in part on performance requirements of the finished product and thus actual addition rates will likely vary.

Alternatively, if the AEA is to be incorporated in concrete, it will typically be added as part of the batch operation where the sand, aggregate, portland cement and water are mixed to form wet concrete, which is placed and allowed to harden. The shampoo waste may be added to the make-up water, or added directly into the mixture during mixing operations. When concentrated shampoo waste is used in the production of concrete, it is preferred that the waste be added at a rate of 0.05% to 3.0% on a weight-to-weight basis with the portland cement used in the concrete. When diluted shampoo waste (i.e. rinse water) is used in the production of concrete, it is preferred that the waste comprise 3% to 20% on a volumetric basis of the concrete mixture. Dilute shampoo rinse waste may also or alternatively be added to the mix water or replace the mix water.

If the second product is concrete and products derived concrete, precast concrete objects, concrete designed for cold climate exposures, stucco, mortars and grouts, it is contemplated that the dilute waste material will be used as a portion of the make-up water for the second product.

Characteristics of Products Produced using the Methods Herein

It is contemplated that use of the methods herein may be advantageously applied to produce a product that can be characterized as being one or more of the following:

(a) an air entrained cement comprising a waste material generated during the manufacture of a first product as an air entraining admixture, possibly having the amount of waste material be 0.05% to 0.75% of the amount of cement clinker on a weight to weight basis of the cement;

(b) a concrete comprising a waste material generated during the manufacture of a first product as an air entraining admixture, possibly having the amount of waste materials be 0.05% to 3% of the amount of cement on a weight-to-weight basis used in the concrete, or possibly having the amount of waste materials be 3% to 20% of the amount of cement on a weight-to-weight basis used in the concrete;

(c) a cement comprising calcined shampoo waste;

(d) a concrete comprising shampoo waste; and (e) a structure comprising the any of the cements or concretes described above.

EXAMPLE 1

Utilizing Concentrated Shampoo Waste in Production of Cement

In one instance, a quantity of shampoo waste was obtained and used in the following manner: A quantity of air entrained plastic type of portland cement was manufactured by intergrinding 5000 gallons of shampoo waste into 7000 tons of portland cement clinker, modified to meet specifications for plastic cement. The manufactured cement (second product) was sold in bagged and bulk form.

EXAMPLE 2

Utilizing Dilute Shampoo Waste in Production of Concrete

In another instance, it is contemplated that a quantity of dilute shampoo waste may be obtained and used in the following manner: 180 gallons of the dilute waste would be added to 643 pounds of ordinary portland cement. To the mixture would be added 1707 pounds of coarse aggregate (2–3% moisture content) and 1310 pounds of sand (6% moisture content). The resultant one cubic yard of concrete (second product) would have superior freeze thaw performance attributes.

Thus, specific embodiments and applications of recycled waste as air entraining admixtures have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of recycling waste comprising:
   obtaining a liquid waste material resulting train the manufacture of a first product;
   utilizing The obtained liquid waste material as an air entraining admixture in the production of a second product; and
   wherein the step of utilizing includes incorporating the liquid waste into a grinding stage of cement clinker, and wherein the first product is a soap or shampoo.

2. The method of claim 1 wherein the waste material has a pH greater than 8.0.

3. The method of claim 1 wherein the waste material has a BOD greater than 1000 mg/L.

4. The method of claim 1 wherein the waste material comprises water, at least one surfactant, and at least one fragrance.

5. The method of claim 1 wherein the waste material causes foaming in aeration tanks of treatment plants.

6. The method of claim 1 wherein the waste material is a soap or shampoo.

7. The method of claim 1 wherein the first waste product is a product used to wash a person's skin or hair.

8. The method of claim 1 wherein the second product comprises cement, and the waste material is used in formation of at least some of the clinker used in the cement.

9. The method of claim 8 wherein the waste is added during finish grinding of the clinker.

10. The method of claim 1 wherein the second product comprises concrete, and the waste material is mixed with cement and water to form the concrete.

11. The method of claim 1 wherein the second product comprises concrete.

12. The method of claim 1 wherein the waste material comprises at least one of the following: materials not meeting specifications, expired product, and discontinued product.

13. The method of claim 1 wherein the waste materials comprises rinse water used in purging of lines, clean-up operations, and rinsing of equipment and tanks.

14. The method of claim 1 wherein the method further comprises:
   utilizing the obtained waste material as an air entraining admixture in the production of a concrete comprising clinker and g water, the waste material being added to the concrete either as part of the clinker or as an ingredient in addition to the clinker and water.

15. A cement product manufactured using the method of claim 1.

16. The cement product of claim 15, the product comprising a cement wherein the amount of waste material is 0.05% to 0.75% of the amount of cement clinker on a weight to weight basis of the cement.

17. The cement product of claim 15 wherein the cement product is concrete.

18. The concrete of claim 17 wherein the amount of waste materials is 0.05% to 3% of the amount of cement on a weight-to-weight basis used in the concrete.

19. The concrete of claim 17 wherein the amount of waste materials is 5% to 20% of the amount of cement on a weight-to-weight basis used in the concrete.

20. The cement product of claim 15 wherein the cement product is a concrete structure.

21. The cement product of claim 15 wherein the cement product is cement manufactured by calcining and incorporating shampoo waste during grinding of the cement clinker.

22. A method of recycling waste comprising:

obtaining a liquid waste material resulting from the manufacturing process of soap or shampoo;

utilizing the obtained liquid waste material as an air entraining admixture in the production of concrete; and wherein the step of utilizing includes at least partially replacing a concrete mix water with the liquid waste such that substantially all of the water in the concrete is water from the waste material.

* * * * *